R. P. ERHARD.
EYEGLASSES OR SPECTACLES.
APPLICATION FILED OCT. 5, 1920.

1,401,327.

Patented Dec. 27, 1921.

Inventor
R. P. Erhard,
By C. A. Snow & Co.
Attorneys

Witness

UNITED STATES PATENT OFFICE.

ROBERT P. ERHARD, OF JUNIATA, PENNSYLVANIA.

EYEGLASSES OR SPECTACLES.

1,401,327.  Specification of Letters Patent.  Patented Dec. 27, 1921.

Application filed October 5, 1920. Serial No. 414,724.

*To all whom it may concern:*

Be it known that I, ROBERT P. ERHARD, a citizen of the United States, residing at Juniata, in the county of Blair and State of Pennsylvania, have invented a new and useful Eyeglasses or Spectacles, of which the following is a specification.

This invention relates to improvements in eyeglasses or spectacles, the object of the invention being to provide a frame in which is mounted a multi-focal lens which can be adjusted by the user to bring the portion of the lens having the proper focus into line with his vision, and which is simple in construction, economical to manufacture and highly efficient in use.

With the foregoing and other objects in view, which will appear as the description proceeds, the invention consists in the novel features of construction and combination of parts which will be more fully described hereinafter and particularly pointed out in the claims.

In the drawings accompanying and forming part of this specification,

The same characters of reference designate the same parts in the different figures of the drawings.

Figure 4:
Fig. 4 is an enlarged sectional view taken on the line 4—4 of Fig. 3.

Referring to the drawings, 2 designates a frame of channel formation as shown at 3, Fig. 4, adapted to carry a multi-focal lens, the frame being preferably so constructed that the vision will be through the lower lens. The frame 2 has a portion set inwardly, as at 4, to define a pair of shoulders within the frame and to expose a portion of the periphery of the lens. A multi-focal lens is mounted in the frame and adapted to be rotated therein to bring the portion of the lens having the proper focus into line with the vision of the user. In the present instance I have illustrated a lens having portions 5, 6, 7 and 8 of different foci, of which the portion 5 may be for reading at a distance of sixteen to eighteen inches from the eye, 6 may be a strong glass for fine work and close vision, 7 may be for long distance, while 8 may be for a vision of three to six feet. A projection 9 is carried by the lens and is adapted to stop the rotation thereof at the proper place by contact with the frame. This projection may be a steel pin secured in the lens.

Figure 1:
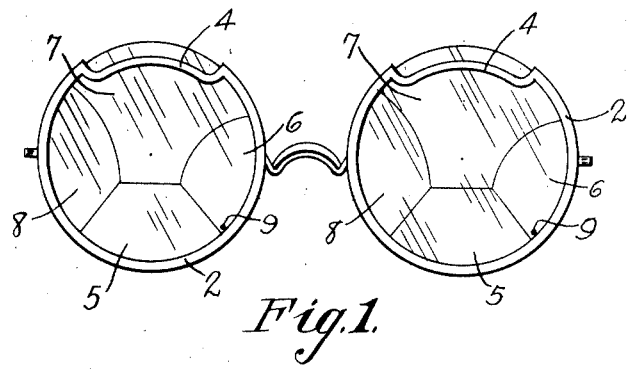
Figure 1 is a front elevation of a pair of spectacles embodying the present improvement, showing the lenses in one of the positions of adjustment.
Figure 2:
Fig. 2 is a bottom edge view thereof.
Figure 3:
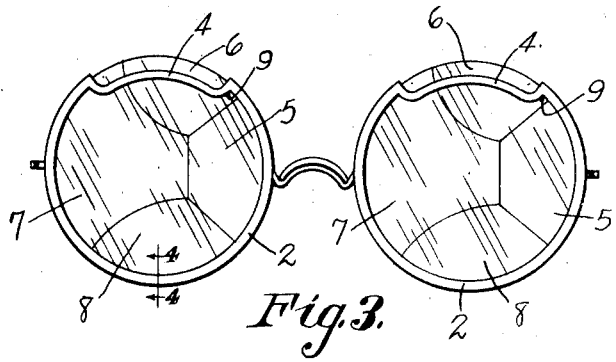
Fig. 3 is a view similar to Fig. 1, but showing another position of the lenses.

The operation of the lens is very simple. A person desiring to use the portion 5, for instance, would, by placing his finger in contact with the edge of the lens projecting beyond the inwardly set portion of the frame and rotating the lens, adjust the latter to the position shown in Fig. 1, while if he desired to use the portion 8 of the lens he would rotate it to the position shown in Fig. 3. This position is as far as the lens can be rotated in one direction, because the stop 9 is now in contact with the shoulder of the frame. Therefore, if he desires to use the portion 6 he will rotate the lens in the opposite direction until the portion 6 is at the lower part of the frame, and in order to use the portion 7 he would continue to rotate the lens in the same direction until the stop engages the opposite shoulder of the frame. It will thus be seen that I have provided a pair of spectacles which are capable of a variety of uses. For instance, a person well advanced in years who has not the power of changing the focus of the eye, may have the advantage of four lenses of different foci to suit the distance required. Again, a watchmaker may have the benefit of a powerful lens adapted to enable him to make a close observation of his work, and he can adjust one lens for this purpose while the other may be adjusted for reading, so that he may close one eye while examining his work and looking through the powerful lens, and if he should have occasion to look down on his desk he may do this by merely opening the eye that was closed and closing the other eye.

While I have described in detail the structure herein illustrated, it is to be understood that I do not thereby limit my invention to the precise features of construction shown, as I am aware that many mechanical changes and modifications may be made therein without departing from the spirit and scope of the invention as set forth in the claims hereto appended.

Having thus described my invention, what I claim is:

1. A pair of glasses, comprising a frame, and a multi-focal lens mounted for rotation in said frame, a portion of the frame being set inwardly to define a pair of shoulders and to expose a portion of the periphery of the lens thereby to facilitate the rotation of the lens, said lens carrying a projection adapted to limit the rotation of the lens and coöperating with said shoulders to dispose certain parts of the lens to the field of vision.

2. A pair of glasses, comprising a frame which is trough-shaped in cross section, and a multi-focal lens mounted for rotation in the frame, the frame including an inset portion which exercises a double function in that it exposes a portion of the periphery of the lens, and serves, also, to define shoulders, the lens carrying a projection located within the frame and coöperating with the shoulders to limit the rotation of the lens, the projection coöperating with the frame, to hold the lens therein for rotation.

In testimony that I claim the foregoing as my own, I have hereto affixed my signature in the presence of two witnesses.

ROBERT P. ERHARD.

Witnesses:
H. H. THOMPSON,
W. H. KAUFFMAN.